United States Patent [19]

Malgarin

[11] 4,183,622
[45] Jan. 15, 1980

[54] SOLAR BEACON

[76] Inventor: Albert Malgarin, 4218 S. 248th St., Kent, Wash. 98031

[21] Appl. No.: 871,427

[22] Filed: Jan. 23, 1978

[51] Int. Cl.² .............................................. G02B 5/12
[52] U.S. Cl. ....................................... 350/99; 340/25; 350/100
[58] Field of Search .......................... 350/299, 289, 99; 340/25, 26, 27 N, 50; 60/39; 136/206–289, 96 SA, 89 SA

[56] References Cited

U.S. PATENT DOCUMENTS

| | | | |
|---|---|---|---|
| 1,932,477 | 10/1933 | Rebori | 340/25 |
| 3,006,251 | 10/1961 | Wells | 350/99 |
| 3,436,729 | 4/1969 | Zurcher | 340/25 |
| 3,781,647 | 12/1973 | Glaser | 136/89 SA |

*Primary Examiner*—John K. Corbin
*Assistant Examiner*—B. W. de los Reyes
*Attorney, Agent, or Firm*—Seed, Berry, Vernon & Baynham

[57] ABSTRACT

A self contained solar beacon for reflecting sunlight over a large number of widely scattered reflection paths. The beacon includes three reflector arrays secured to the outer ends of respective horizontal reflector shafts which extend radially from a central mounting plate. The mounting plate is rotated about a vertical axis by an electric motor which is connected to the mounting plate through a drive shaft. The reflector shafts are rotatably carried by the mounting plate, and their inside ends terminate in respective friction discs which roll along a stationary friction plate. Consequently, as the motor rotates the mounting plate, the reflector arrays simultaneously move along a horizontal, circular path while rotating about their radial axes. This combination of reflector array movement coupled with the large number of individual reflectors in each array produces a large number of widely scattered reflection paths. The motor is preferably powered by a set of internal solar cells, but it may also be powered by an internal battery or external electric power.

7 Claims, 3 Drawing Figures

4,183,622

SOLAR BEACON

BACKGROUND OF THE INVENTION

1. Field of the Invention

This invention relates to aircraft anti-collision devices, and more particularly, to an aircraft solar beacon for reflecting sunlight from an airplane over a large number of widely disbursed reflection paths.

2. Description of the Prior Art

Aircraft anti-collision beacons are in common use for allowing pilots of aircraft to see other aircraft in order to avoid mid-air collisions. The most common and most effective anti-collision system is a flashing strobe light mounted on either the wing tips or the fuselage. Another commonly used anti-collision light is the flashing or rotating red beacon usually mounted near the empanage of the aircraft. The strobe light anti-collision system, and to a lesser degree, the flashing or rotating red beacon, is extremely effective in preventing mid-air collisions during low light or overcast conditions. However, on a clear, sunny day even these systems fail to markedly improve the visibility of aircraft for two basic reasons. First, anti-collision lights, including high intensity strobe lights, are not as visible in bright daylight as they are in low light conditions since the light-dark contrast is not as great. Second, on a clear day aircraft are not highlighted against a background, such as a layer of clouds so that they are more difficult to see on a clear day. Additionally, on a clear day more objects are visible, and these other objects have a tendency to distract one's attention from an approaching aircraft.

Attempts have been made in the past to devise a solar beacon for increasing the visibility of aircraft in order to prevent mid-air collisions. Examples of two such devices are described in U.S. Pat. No. 3,583,793 issued to Crisogono and U.S. Pat. No. 3,006,251 issued to Wells. The principal disadvantages of these prior art devices is that they do not disburse sunlight in a sufficiently large number of beams nor in a sufficiently large number of directions to make the aircraft readily visible.

SUMMARY OF THE INVENTION

It is an object of the invention to provide a solar beacon capable of simultaneously reflecting sunlight in a large number of widely varying directions.

It is still another object of the invention to provide a solar beacon having a moving reflector which does not require external power and which is automatically actuated in the presence of sunlight.

It is a further object of the invention to provide a solar beacon which is extremely compact and relatively light in weight.

These and other objects of the invention are accomplished by a solar beacon having a plurality of reflector arrays each having a large number of individual reflectors. The reflector arrays are rotatably supported with their axis of rotation extending radially from a common center. The reflector arrays are simultaneously moved about the common center in a circular path and rotated about their rotational axis so that sunlight is reflected in a large number of widely scattered directions. The reflector arrays are preferably secured to the outer ends of a shaft rotatably mounted in a mounting plate. The mounting plate is rotated by a motor about a central axis perpendicular to the rotational axes of the reflector arrays. The inner ends of the reflector shafts carry friction discs which roll along a stationary drive plate so that as the reflector mounting plate rotates the reflector arrays are rotated by the reflector shaft while the reflector mounting plate moves the reflector arrays in the circular path. The motor is preferably powered by an array of solar cells positioned around the motor beneath the reflector arrays.

DETAILED DESCRIPTION OF THE FIGURES OF THE DRAWINGS

DETAILED DESCRIPTION OF THE PREFERRED EMBODIMENTS

Figure 1:
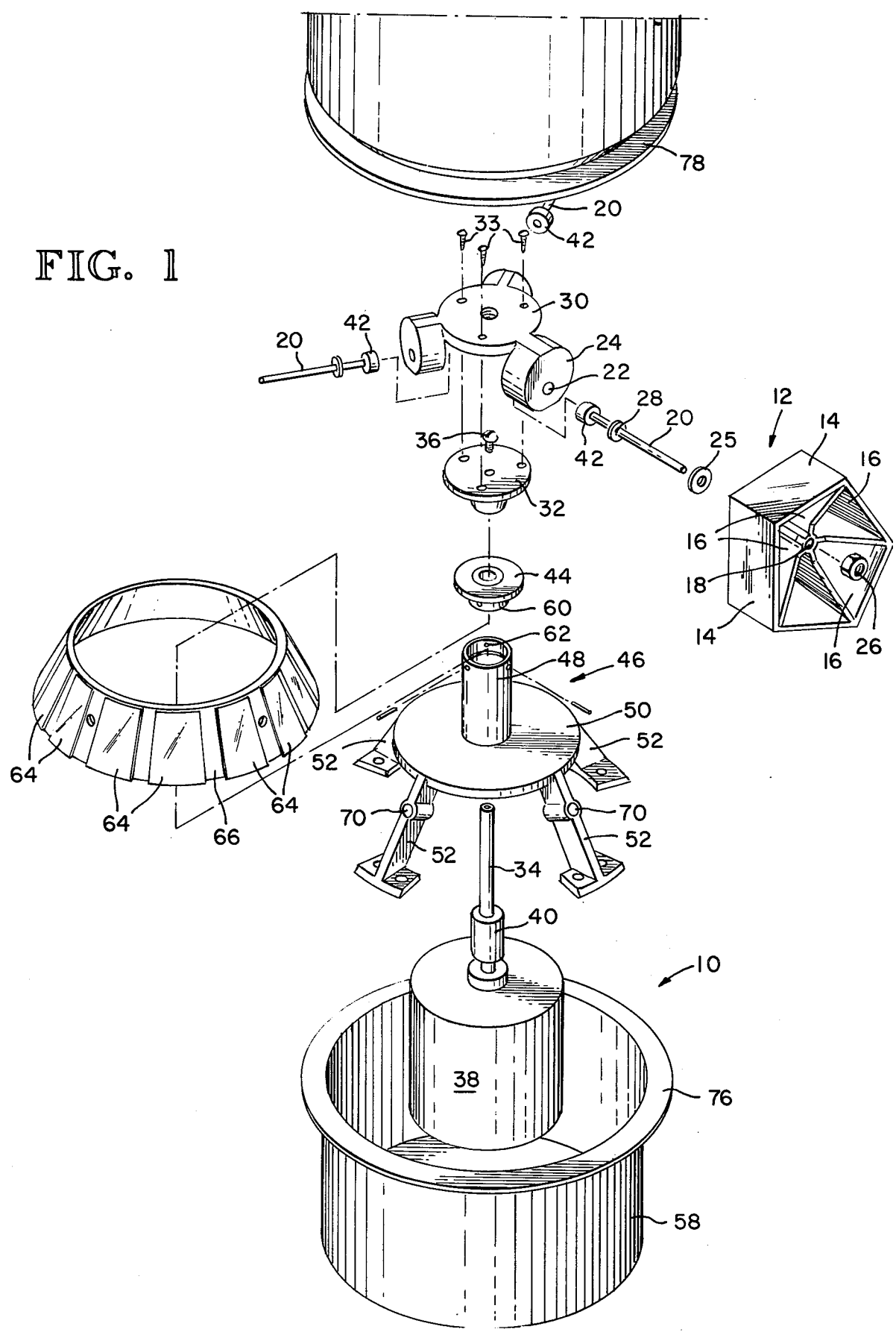
FIG. 1 is an exploded isometric view of the solar beacon.
Figure 2:
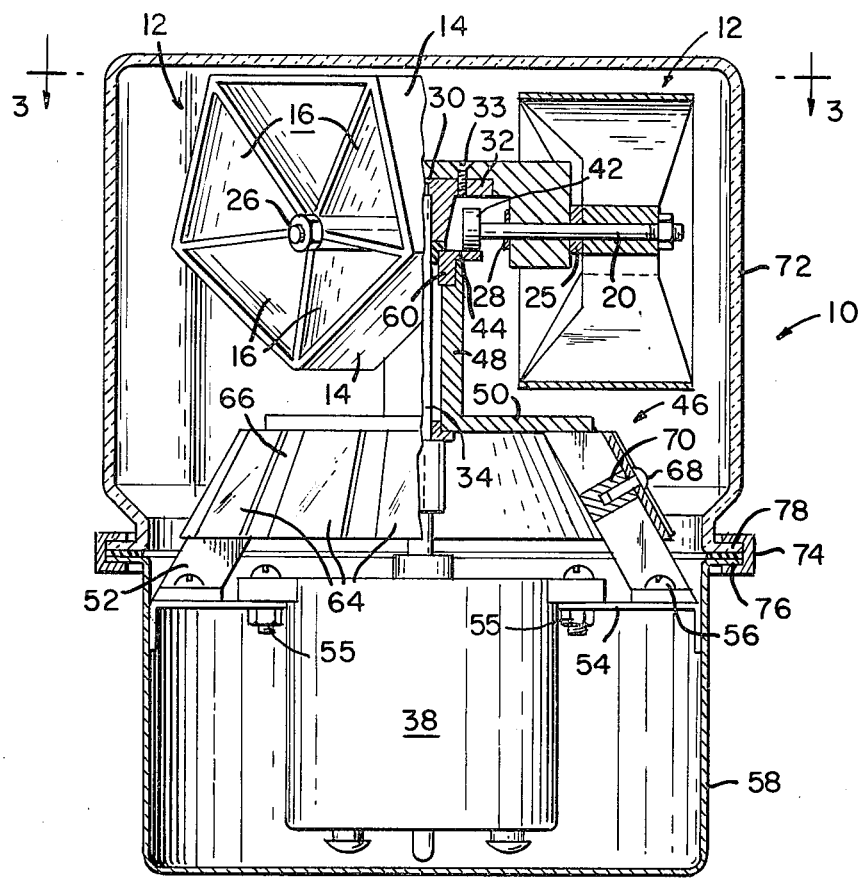
FIG. 2 is a partial elevational, partial cross-sectional view of the solar beacon.
Figure 3:
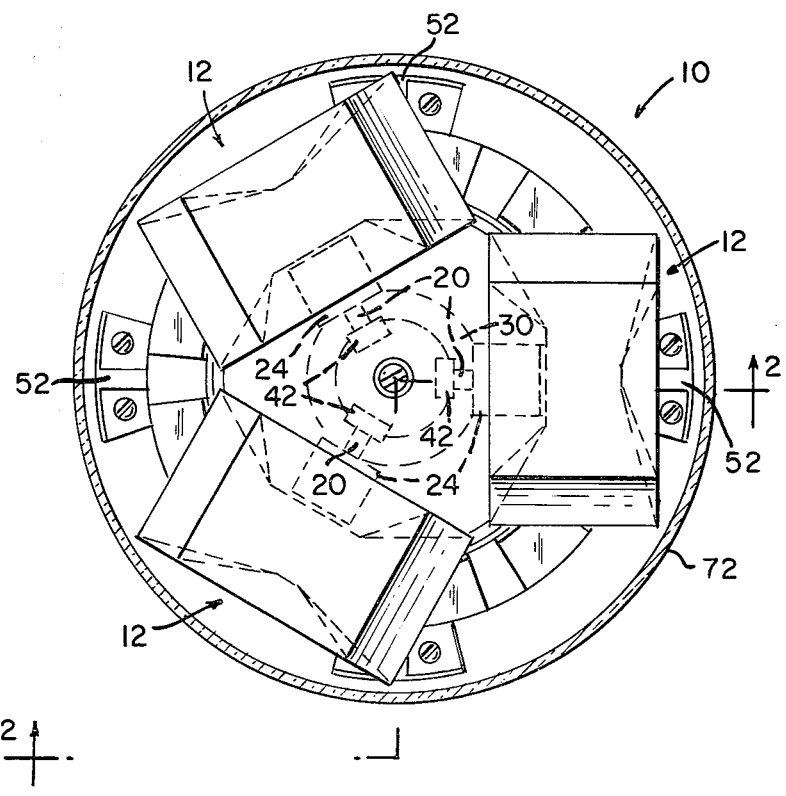
FIG. 3 is a top plan view of the solar beacon.

With reference to the drawings, the solar beacon employs a plurality of hexagonal reflector arrays 12 each of which includes five rectangular mirrors 14 and five generally triangular mirrors 16 angled inwardly from the outside toward the center. In alternate embodiments, reflector arrays having structures different from the reflector array 12 illustrated herein may be advantageously employed. Each of the reflector arrays includes a center bore 18 receiving a reflector shaft 20. The reflector shaft 20 is inserted through a bore 22 in a shaft mounting piece 24 so that the shaft 20 is free to rotate within the bore 22. As best illustrated in FIG. 2, after the shaft 20 passes through the bore 22, it passes through a spacer washer 24 and the bore 18 in the reflector array, and is secured in place by a nut 26. Radial movement of the shaft 20 within the bore 22 is prevented by a washer 28 fixedly secured to the shaft 20.

The reflector shaft mounting pieces 24 are carried by a disc-like mounting plate 30 which, as best illustrated in FIG. 2, is secured to a drive plate 32 by screws 33. The drive plate 32 is in turn secured to the end of a drive shaft 34 by a screw 36. The lower end of the drive shaft 34 is driven by an electric motor 38 through a spring loaded coupler 40 which resiliently biases the shaft 34 toward the motor 38. Thus the motor 38 rotates the reflector mounting plate 30 about the axis of the shaft 34.

The inner ends of the reflector shafts 20 carry a friction roller 42 which, as best illustrated in FIG. 2, contacts the upper surface of a friction plate 44. The friction plate is carried by a base 46 including a support cylinder 48, a support disc 50 and a plurality of support feet 52. The lower end of the support feet 52 are fastened to a mounting ring 54 (FIG. 2) by screws 56. The mounting ring 54, which also supports the motor 38 through fasteners 55, is fastened to a cylindrical housing 58. The friction plate 44 includes a cylindrical portion 60 which is received by the support cylinder 48 and secured in place by retaining pins 62. Thus the base 46 supports the friction plate 44 in a fixed position against the friction rollers 42 which are resiliently biased against the plate 32 by the spring coupler 40.

Power is applied to the motor 38 from an array of solar cells 64 secured to a mounting panel 66 having a truncated conical shape. The panel 66 is placed around the base 46 and secured in place by screws 68 threaded into cylindrical bosses 70 integrally formed in the feet 52. Also, although it is preferable to power the motor 38 by solar electricity produced by the solar cell 64, the motor may also be powered by such sources as an internal battery or power supplied by the aircraft.

The operation of the solar beacon can best be explained with reference to FIG. 2. As the motor 38 rotates the mounting plate 30 about the axis of the shaft 34 the reflector assemblies 12 move in a circular path about the axis of the shaft 34. As the reflector plate 30 moves with respect to the friction plate 44, the friction rollers 42 roll along the upper surface of the friction plate 44 so that the reflector shafts 20 rotate within the bore 22 thereby causing the reflectors 12 to rotate as they move along the circular path. This combination of motion causes the individual reflectors 14, 16 in the array 12 to position themselves at a wide variety of angles with respect to the sun thereby producing a large number of widely spaced reflection paths. Other drive systems such as, for example, a bevel gear arrangement, may be utilized in place of the friction roller 42 and friction plate 44.

The housing 58 is enclosed by a transparent cover 72 which is removably secured to the housing 58 by a clamp 74 positioned around flanges 76, 78 formed in the housing 58 and cover 72, respectively.

I claim:

1. An aircraft solar beacon for improving aircraft visibility, comprising:
   a plurality of reflector arrays each having a plurality of individual reflectors; and
   drive means for rotating said reflector arrays about respective first rotational axes extending radially from a common center while moving said reflector arrays about a second rotational axis around said common center in a circular path.

2. The solar beacon of claim 1 wherein each of said reflector arrays comprise:
   a reflector frame generally having the shape of a prism with the outer base of each prism having formed therein a plurality of triangular panels corresponding in number to the number of lateral faces of said prism;
   a triangular reflector covering each triangular panel of said reflector frame; and
   a reflector covering each lateral face of said reflective frame, said reflectors having a shape corresponding to the shape of said lateral faces.

3. The solar beacon of claim 2 wherein the rotational axis of each reflector array extends through said reflector frame perpendicular to the basis of said frame parallel to, and equally spaced from, the lateral faces of said frame.

4. The solar beacon of claim 1 wherein said drive means comprise:
   a reflector array drive shaft having one end connected to each reflector array, said drive shaft extending along the rotational axis of said reflector arrays;
   rotational drive means having an output shaft;
   a reflector array mounting member operatively connected to said output shaft, said mounting member rotatably supporting each of said reflector array drive shafts with said drive shafts extending along said respective radials from the rotational axis of said output shaft;
   a generally planar stationary coupling member occupying a plane which is perpendicular to the rotational axis of said output shaft; and
   an annular coupling member secured to each of said reflector array drive shafts adjacent said stationary member, said annular coupling members engaging said stationary member such that rotation of said mounting member produced by said rotational drive means causes said annular coupling members to roll along said stationary coupling member thereby rotating said reflector arrays about the axes of respective drive shafts while said mounting member moves said reflector array around the axis of said output shaft in a circular path.

5. The solar beacon of claim 4 wherein said drive means is powered by an electric motor, and wherein said beacon further includes a set of solar cells operatively connected to said motor such that sunlight causes movement of said reflector arrays without the need for external power.

6. The solar beacon of claim 5 wherein said solar cells are mounted on an annular frame extending around the rotational axis of said output shaft.

7. The solar beacon of claim 4 wherein said annular coupling members are cylindrical friction rollers and said stationary coupling member is a planar friction plate such that rotation of said reflector array mounting member causes said friction rollers to roll on the face of said friction plate.

* * * * *